US006137047A

United States Patent [19]

Sugiyama

[11] Patent Number: 6,137,047

[45] Date of Patent: Oct. 24, 2000

[54] ELECTRONIC APPARATUS WITH ONLINE RECONFIGURATION OF PLD COMPONENTS

[75] Inventor: Tadashi Sugiyama, Hamamatsu, Japan

[73] Assignee: Yamaha Corporation, Hamamatsu, Japan

[21] Appl. No.: 09/277,259

[22] Filed: Mar. 26, 1999

[30] Foreign Application Priority Data

Mar. 30, 1998 [JP] Japan .................................. 10-083384

[51] Int. Cl.[7] ................................ G01P 3/00; G10H 1/02

[52] U.S. Cl. ......................................... 84/626; 434/307 A

[58] Field of Search ............................ 84/600, 626, 662; 434/307 A

[56] References Cited

U.S. PATENT DOCUMENTS 5,663,515 9/1997 Kato .
5,827,990 10/1998 Fujita .............................. 434/307 A X
5,957,696 9/1999 Kageyama .......................... 434/307 A
5,981,860 11/1999 Isozaki et al. .

*Primary Examiner*—Jeffrey Donels
*Attorney, Agent, or Firm*—Pillsbury Madison & Sutro LLP

[57] ABSTRACT

An electronic apparatus is constructed by various devices for collectively executing a task. The electronic apparatus uses at least one electronic circuit device containing a plurality of circuit elements which are reconfigurable into a desired connection mode so as to perform an allotted function during the course of executing the task. Further, in the electronic apparatus, a communication device operates when the allotted function of the electronic circuit device is to be altered. The communication device downloads, from a communication network, circuit design information effective to determine the connection mode of the circuit elements contained in the electronic circuit device. A control device reconfigures the connection mode of the circuit elements in accordance with the downloaded circuit design information to thereby alter the allotted function of the electronic circuit device.

20 Claims, 5 Drawing Sheets

ELECTRONIC APPARATUS WITH ONLINE RECONFIGURATION OF PLD COMPONENTS

BACKGROUND OF THE INVENTION

1. Field of the Invention

The present invention generally relates to an electronic apparatus, a method of modifying circuit configuration of an electronic apparatus, and a karaoke apparatus that allows modifications of circuit configuration in a hardware approach.

2. Description of Related Art

Acoustic effects imparted to a music tone signal of karaoke accompaniment or a live vocal signal of karaoke performance may vary from one scene to another. Therefore, karaoke apparatuses conventionally use, as an effector device, a DSP (Digital Signal Processor) that can be freely modified in its processing contents by use of a microprogram.

However, the DSP processes audio signals in a software approach and therefore is generally slower in processing speed than a dedicated hardware effector device.

A controller of the karaoke apparatus is connected to many peripheral devices. Selection and connection of the peripheral device is determined at the design stage of the karaoke apparatus and cannot be modified after shipment.

SUMMARY OF THE INVENTION

It is therefore an object of the present invention to provide an electronic apparatus with reconfiguration capability, a method of modifying circuit configuration of an electronic apparatus, and a karaoke apparatus that allows modification of a circuit configuration in an online manner through a communication network.

In one aspect of the invention, an electronic apparatus is constructed by various devices for collectively executing a task. The inventive electronic apparatus comprises at least one electronic circuit device containing a plurality of circuit elements, which are reconfigurable into a desired connection mode so as to perform an allotted function during the course of executing the task. Further, in the electronic apparatus, a communication device operates when the allotted function of the electronic circuit device is to be altered. The communication device downloads, from a communication network, circuit design information effective to determine the connection mode of the circuit elements contained in the electronic circuit device. A control device reconfigures the connection mode of the circuit elements in accordance with the downloaded circuit design information to thereby alter the allotted function of the electronic circuit device.

In another aspect of the invention, a method is designed for altering an electronic apparatus being constructed by various devices and collectively executing a task. The inventive method comprises the steps of providing at least one electronic circuit device containing a plurality of circuit elements which are reconfigurable into a desired connection mode so as to perform an allotted function during the course of executing the task, downloading circuit design information from an online source when the allotted function of the electronic circuit device is to be altered, the circuit design information being effective to determine the connection mode of the circuit elements contained in the electronic circuit device, and reconfiguring the connection mode of the circuit elements in accordance with the downloaded circuit design information to thereby alter the allotted function of the electronic circuit device.

In a further aspect of the invention, a karaoke apparatus is constructed by various devices for providing an orchestral accompaniment to a live vocal of a requested song. In the inventive karaoke apparatus, a sound source device operates according to data of the requested song for generating a music tone of the orchestral accompaniment to accompany the live vocal. At least one effector device is provided for applying an acoustic effect to either of the music tone and the live vocal during the course of the orchestral accompaniment. The effector device has a reconfigurable circuit structure to alter the acoustic effect. A memory device stores reconfiguration information of the effector device. A control device operates when the acoustic effect is to be altered for retrieving the reconfiguration information from the memory device and for reconfiguring the circuit structure of the effector device according to the retrieved reconfiguration information. Preferably, the memory device stores the reconfiguration information as a part of the data of the requested song, and the control device retrieves the reconfiguration information from the memory device to alter the acoustic effect in matching with the orchestral accompaniment of the requested song.

The present invention utilizes a programmable logic device for modifying the circuit configuration of an electronic apparatus. This device allows a user to download circuit configuration information by going online to modify the circuit configuration. Consequently, hardware-dependent problems that may emerge after the shipment of an electronic product can be fixed by the downloaded circuit configuration information. In addition, if an electronic product is shipped with specifications not fully fixed, application of this device to an I/O extension port of the electronic product easily makes the I/O extension port compatible with peripheral extension devices to be connected to the I/O port. Further, application of the present invention to an effect imparting circuit or effector device of a karaoke apparatus allows free application of different acoustic effects to different pieces of music, and allows dynamic application of effects that change with the progress of karaoke music by means of a hardware circuit.

BRIEF DESCRIPTION OF THE DRAWINGS

These and other objects of the invention will be seen by reference to the description, taken in connection with the accompanying drawings, in which.

DETAILED DESCRIPTION OF PREFERRED EMBODIMENTS

Figure 1:
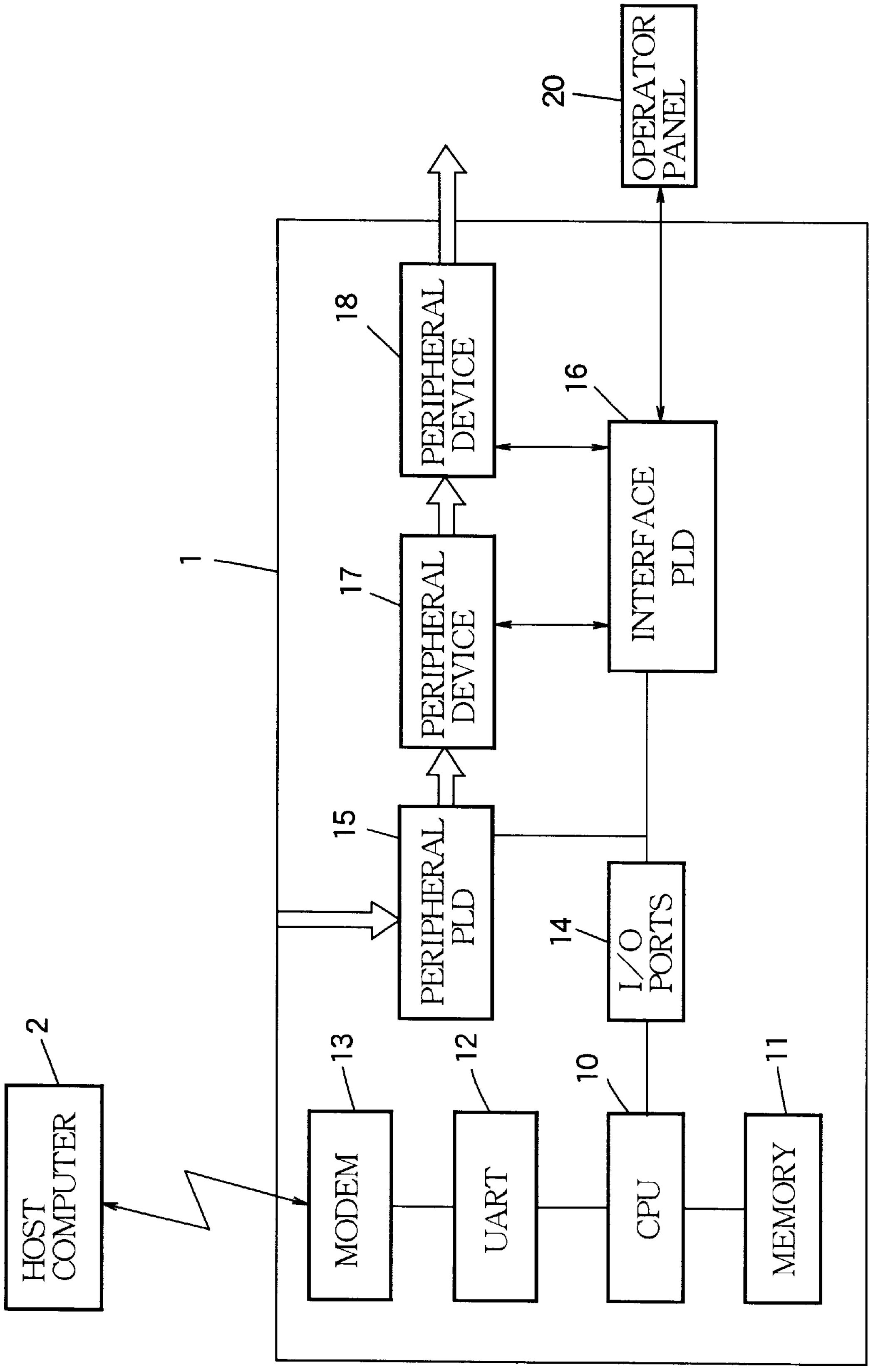
FIG. 1 is a block diagram illustrating an electronic apparatus practiced as one preferred embodiment of the invention.

This invention will be described in further detail by way of example with reference to the accompanying drawings. Now, referring to FIG. 1, a Central Processing Unit (CPU) 10 is in the form of a Universal Asynchronous Receiver/Transmitter (UART) 12, and an Input/Output (I/O) ports 14. The I/O ports 14 are connected to a Programmable Logic Device (PLD) 15 configured for a kind of a peripheral device and a PLD 16 configured as an interface device to peripheral devices 17 and 18. The peripheral devices 15, 17, and 18 are Large Scale Integration (LSI) circuits designed for audio signal processing. The electronic apparatus 1 receives an audio signal, executes filtering, delaying and mixing, for example, on the received audio signal, and outputs the processed audio signal to generate sounds. The peripheral devices 17 and 18 are provided in the form of functional extension boards, which are inserted into slots of the electronic apparatus 1. The interface PLD 16 functions to control the slots such that transfer of data between the peripheral devices 17 and 18 and the CPU 10 is controlled through one of the slots. The interface PLD 16 is connected to an operator panel 20 and passes an input event generated by the operator panel 20 to the CPU 10 through the I/O ports 14.

The UART 12 is connected to a modem 13. The modem 13 communicates with a host computer 2 through a communication line such as a public telephone line. The host computer 2 transmits various data for use by the electronic apparatus 1. At the same time, the host computer 2 transmits information about circuit reconfigurations of the PLD 15 and the PLD 16. The downloaded data and information are stored in the memory 11 to be read by the CPU 10 when required. The CPU 10 operates when processing data by use of the peripheral devices for rewriting the circuit configuration of the peripheral PLD 15 such that a capability required for the data processing is provided. A new circuit configuration is selected from those downloaded from the host computer 2 and stored in the memory 11. If a new peripheral device is to be connected, the circuit configuration of the interface PLD 16 is modified before the connection. This modification is executed by rewriting the wiring of the interface PLD 16 with the circuit configuration information downloaded from the host computer 2.

For example, if a new capability is to be added to a karaoke apparatus and a circuit board for that capability is to be newly connected to the karaoke apparatus, rewriting of the specifications of the interface PLD 16 from a communication network beforehand allows a user to start and execute the newly added capability only by inserting the circuit board for that capability into one of the slots of the karaoke apparatus.

As clear from the above description, the PLD 15 and PLD 16 are electrically erasable PLDs. They may be of Electrically Erasable Programmable Read Only Memory (EEPROM) or SRAM (Static Random Access Memory). These devices may have any circuit scale. For example, the PLD is constituted by an Field Programmable Gate Array (FPGA) having about tens of thousands of gates. The FPGA of SRAM type allows instantaneous circuit reconfiguration, so that the circuit structure or circuit connection mode may be modified in real-time while executing a specific task. Specifically, in the case of a peripheral device for audio processing, a circuit configuration that implements a change of the audio processing may be readily provided. For example, if the peripheral device PLD 15 is constituted as a filtering device such as an Finite Impulse Response (FIR) filter, the number of stages and the coefficient of each tap can be changed and set instantaneously. If the peripheral device PLD 15 is configured as an Infinite Impulse Response (IIR) filter, a feedback coefficient and a delay time can be changed in a hardware approach.

As described above, the inventive electronic apparatus 1 is constructed by various devices for collectively executing a task. The inventive electronic apparatus 1 comprises at least one electronic circuit device in the form of PLD 15 or 16 containing a plurality of circuit elements (logic gates) which are reconfigurable into a desired connection mode so as to perform an allotted function during the course of executing the task. Further, in the electronic apparatus 1, a communication device is provided in the form of UART 12 and operates when the allotted function of the electronic circuit device is to be altered, the communication device downloading circuit design information from the host computer 2. The circuit design information is effective to determine the connection mode of the circuit elements contained in the electronic circuit device. A control device in the form of CPU 10 reconfigures the connection mode of the circuit elements in accordance with the downloaded circuit design information to thereby alter the allotted function of the electronic circuit device.

For example, the electronic apparatus 1 may be designed as a karaoke machine to generate a music sound. In such a case, the electronic circuit device composed of PLD 15 is configured as an audio filter to perform an allotted function of applying an acoustic effect to the sound during the course of executing a task of generating the sound, and the CPU 10 reconfigures the connection mode of the circuit elements of the PLD 15 to alter the acoustic effect. The other electronic circuit device or PLD 16 is dedicated to perform an allotted function of interfacing a peripheral device selected as necessary for executing the task, and the CPU 10 reconfigures the connection mode of the circuit elements of the PLD 16 so as to adapt the allotted function of interfacing to the selected peripheral device. Preferably, the PLDs comprise a programmable gate array having circuit elements instantly reconfigurable in accordance with the circuit design information to thereby realize dynamic alteration of the allotted function during the course of executing the task.

Figure 2:
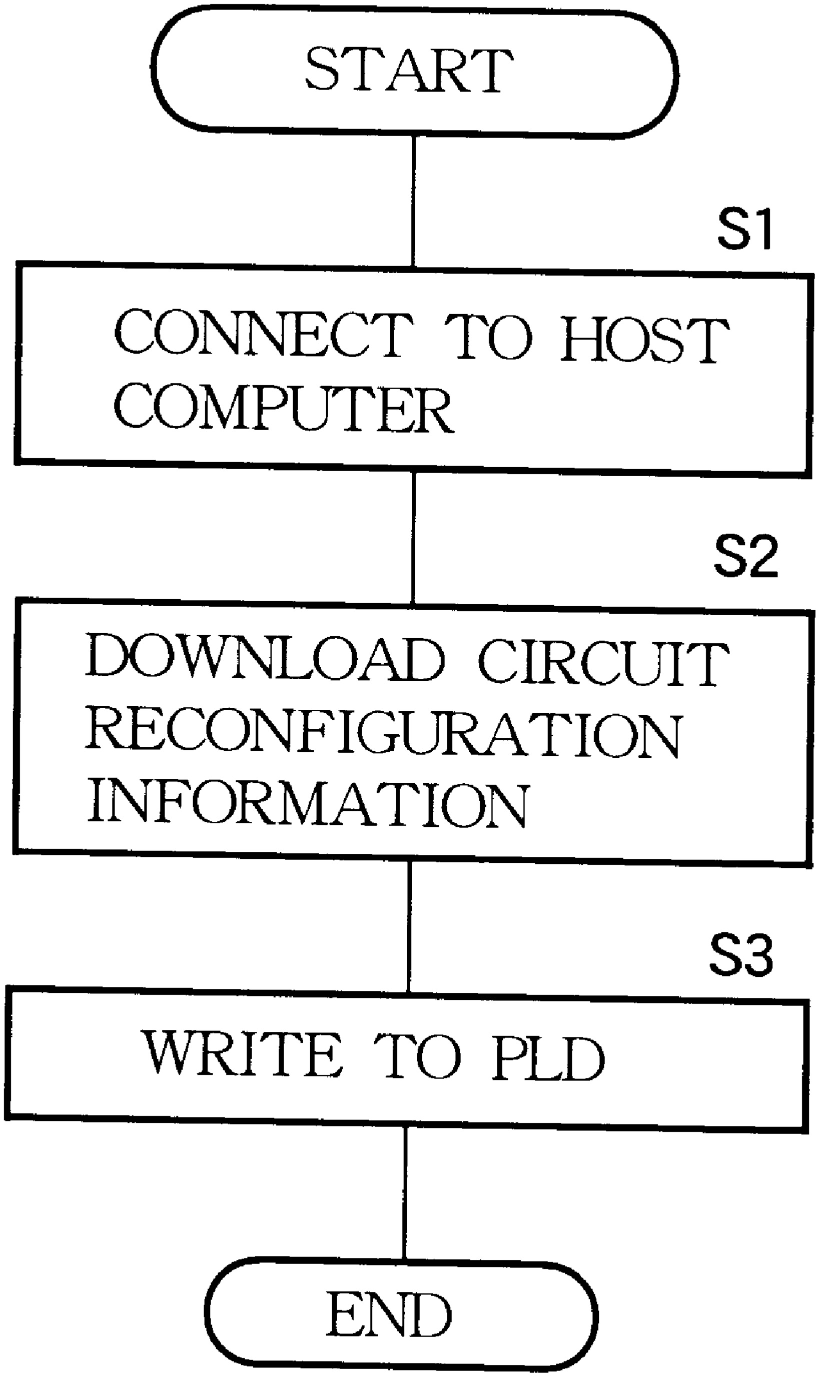
FIG. 2 is a flowchart indicative of an operation of the embodiment shown in FIG. 1.

FIG. 2 outlines an operation of the electronic apparatus 1, in which the circuit configurations or the gate array connection modes of the PLD 15 and the PLD 16 are modified by the circuit design information downloaded from the host computer 2. In step S1, the electronic apparatus 1 is connected to the host computer 2 through the modem 13. In step S2, the circuit design information for modifying the circuit configuration of the PLD 15 or the PLD 16 is downloaded from the host computer 2. In step S3, the current circuit configuration of the PLD 15 or the PLD 16 is reset, and is then rewritten according to the downloaded circuit design information. This rewriting may be made upon downloading of the circuit design information. Alternatively, the downloaded circuit design information may be stored in the memory 11, and is read out later when the circuit reconfiguration becomes necessary. In either case, the PLD circuit configuration can be modified in accordance with the circuit design information downloaded from an online source. Consequently, circuit configurations not implemented at the shipment of the electronic apparatus 1 can be implemented by downloading updated circuit design information from the host computer 2.

Namely, the inventive method is designed for altering an electronic apparatus being constructed by various devices and collectively executing a task. The inventive method comprises the steps of providing at least one electronic circuit device in the form of PLD containing a plurality of circuit elements which are reconfigurable into a desired connection mode so as to perform an allotted function during the course of executing the task, downloading circuit design information from a communication network when the allotted function of the PLD is to be altered, the circuit design information being effective to determine the connection mode of the circuit elements contained in the PLD, and reconfiguring the connection mode of the circuit elements in accordance with the downloaded circuit design information to thereby alter the allotted function of the PLD.

Figure 3:
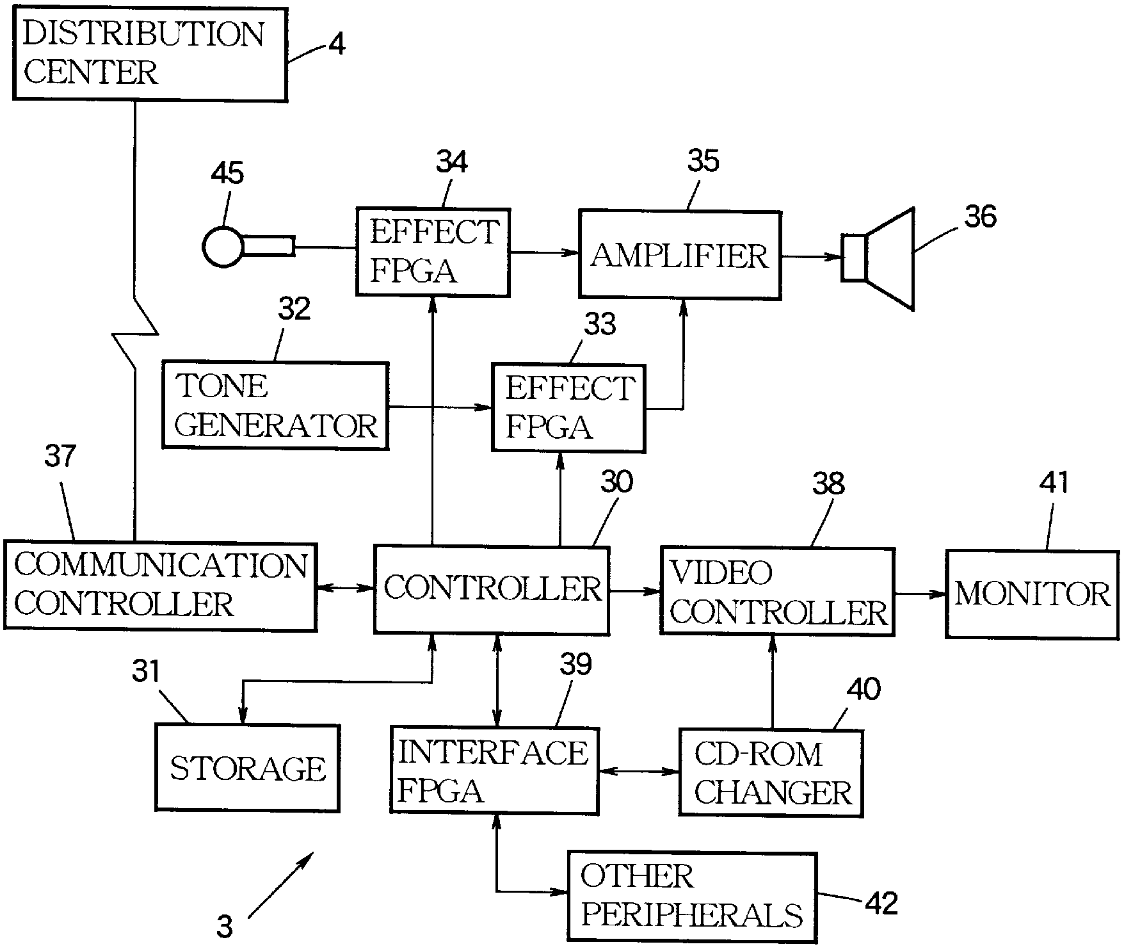
FIG. 3 is a block diagram illustrating an example in which the present invention is applied to a karaoke apparatus.

Now, referring to FIG. 3, a karaoke apparatus 3 has a controller 30 for controlling the karaoke apparatus 3 and is connected to a storage 31, effect FPGAs 33 and 34, a tone generator 32, a communication controller 37, a video controller 38, and an interface FPGA 39. The storage 31 includes a hard disk drive and a semiconductor memory, and the storage 31 stores an operation program and song data for performing karaoke music. The song data downloaded from a distribution center 4 through the communication controller 37 is stored in the hard disk. Only the song data for a music piece requested to be performed from time to time is read from the hard disk and loaded into the semiconductor memory or RAM.

The tone generator 32 generates a music tone for karaoke performance or orchestral accompaniment based on the song data. The tone generator 32 comprises a tone generating circuit for electronically synthesizing a music tone signal and a voice processing circuit or voice processor for reproducing a pulse-code modulated (PCM) voice signal (for example, a background vocal). The tone signal generated by the tone generator 32 is inputted into the effect FPGA 33. A singing voice signal or live vocal signal inputted from a microphone 45 is fed to the other effect FPGA 34. These effect FPGAs 33 and 34 apply acoustic effects of filter type and reverberation type to the inputted music tone signal and the singing voice signal, respectively. Each of the effect FPGAs 33 and 34 has analog macros of an A/D converter at the input side and a D/A converter at the output side. The internal circuitry elements of the FPGAs 33 and 34 can be configured at the user side to constitute a digital filter circuit and a digital delay circuit by the circuit design information. The effect FPGAs 33 and 34 are composed of a SRAM and therefore the configuration of the internal circuitry cells can be modified almost instantaneously. The circuit design information for determining the internal circuitry configuration is included in the above-mentioned song data for performing a request karaoke song. The music tone signal and the singing voice signal outputted from the effect FPGAs 33 and 34 are mixed with each other and amplified by an amplifier 35. The resultant audio signal is outputted from a loudspeaker 36 as a sound of karaoke performance.

Thus, implementing each effect imparting circuit with an FPGA significantly increases the processing speed as compared with the processing speed provided by a DSP. The FPGA is simpler in structure and lower in cost than the DSP. Therefore, complicated acoustic effects can be imparted at significantly fast response to the music tone signal and singing voice signal by installing two or more FPGAs. Alternatively, an FPGA may be used for a processing block of the DSP. The configuration of such an FPGA may be rewritten by circuit design information to be used in the tone signal processing.

The video controller 38 is connected to a CD-ROM changer 40. The CD-ROM changer 40 reproduces a background video as instructed by the controller 30, and supplies the reproduced background video to the video controller 38. The video controller 38 combines a lyrics text prompt with the background video in a superimposing manner, and displays the resultant image on a monitor 41. The CD-ROM changer 40 is connected to the controller 30 through the interface FPGA 39. The configuration of the interface FPGA 39 can be rewritten to adapt to a peripheral device to be connected to the interface FPGA 39 through a connector. External device, other than the CD-ROM changer 40 may be selectively connected to the interface FPGA 39. The updated circuit design information used in this rewriting is also downloaded from the distribution center 4.

As described above, the inventive karaoke apparatus is constructed by various devices for providing an orchestral accompaniment to a live vocal of a requested song. In the inventive karaoke apparatus, a sound source device in the form of the tone generator 32 operates according to data of the requested song for generating a music tone of the orchestral accompaniment to accompany the live vocal. At least one effector device in the form of FPGA 33 or 34 is provided for applying an acoustic effect to the music tone and/or the live vocal during the course of the orchestral accompaniment. The FPGA has a reconfigurable circuit structure to alter the acoustic effect. A memory device in the form of the storage 31 stores reconfiguration information of the FPGA. The control device 30 in the form of CPU operates when the acoustic effect is to be altered for retrieving the reconfiguration information from the storage 31 and for reconfiguring the circuit structure of the FPGA 33 or 34 according to the retrieved reconfiguration information.

Preferably, the storage 31 stores the reconfiguration information as a part of the data of the requested song, and the control device 30 retrieves the reconfiguration information from the storage 31 to alter the acoustic effect in matching with the orchestral accompaniment of the request song. Preferably, the FPGA is made of SRAM instantly reconfigurable in response to retrieval of the reconfiguration information to thereby realize dynamic alteration of the acoustic effect during the course of the orchestral accompaniment.

The karaoke apparatus 3 further includes peripheral devices such as the CD-ROM changer 40 selectable to support execution of the orchestral accompaniment, and an interface device in the form of the interface FPGA 39 having a reconfigurable circuit structure for interfacing selected one of the peripheral devices. The control device 30 operates when the selected peripheral device is changed to another peripheral device 42 for retrieving reconfiguration information from the storage 31 and for reconfiguring the circuit structure of the interface FPGA 39 in accordance with the retrieved reconfiguration information so as to adapt the interface FPGA 39 to another peripheral device 42. The karaoke apparatus 3 further includes a communication device in the form of the communication controller 37 operative when the acoustic effect is to be altered. The communication device downloads reconfiguration information of the FPGAs into the storage 31 from an online source.

Figure 4:
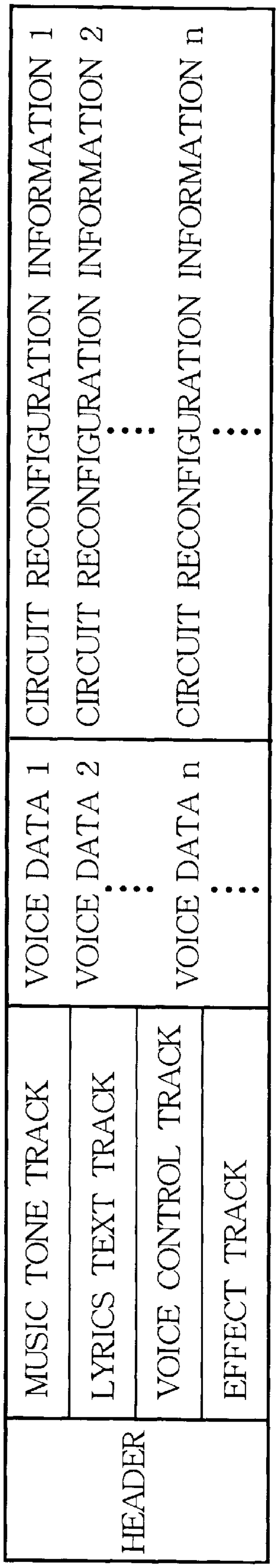
FIG. 4 illustrates an example of song data for use in the karaoke apparatus shown in FIG. 3.

Now, referring to FIG. 4, the song data to be used by the karaoke apparatus 3 for karaoke performance comprised of a header, a music tone track, a lyrics text track, a voice control track, an effect track, a voice data part, and a circuit reconfiguration information part. The header contains various data associated with the song data such as a title, genre, release date, and playtime.

Each of the above-mentioned tracks is formed by sequence data composed of plural items of event data and duration data At indicative of a time interval between the items of event data. Based on a sequencer program, the controller 30 reads the data from all tracks concurrently at the time of karaoke performance. The sequencer program counts At by a predetermined tempo clock. When At has been lapsed, the controller 30 reads the subsequent event data and supplies the same to a predetermined processing block.

The tone track is formed with sub tracks of various parts such as a melody sub track and a rhythm sub track. The lyrics text track records sequence data for displaying lyrics text on the monitor 41. This sequence data is not music tone data based on MIDI. However, this track is also written in MIDI data format so as to provide integration in implementation, thereby facilitating job processes. The type of this sequence data is a system exclusive message. The voice control track is a sequence track for specifying the generation timing of voice data n (n=1, 2, 3, . . . ) recorded on the voice data part by way of example. The voice data part stores samples of human voices such as background vocal and harmony vocal that are difficult to synthesize by the tone generator. The voice control track is written with voice specification data and duration data Δt for specifying the timing of outputting the voice data to the voice processor in the tone generator 32 to form a voice signal. The voice specification data is composed of a voice data number, interval data, and volume data. The voice data number is an identification number n for each item of voice data recorded on the voice data part. The interval data and the volume data specify the interval and volume of the voice data to be reproduced. Namely, background vocals such as "aaaaaaa . . . " and "wawawawawa . . . " accompanying no word can be used multiple times by varying the interval and/or volume. Therefore, one background vocal may be stored with the basic interval and volume for repetitive use by shifting the interval and volume based on the interval data and volume data. The voice processor sets an output level based on the volume data and varies the read interval of the voice data based on the interval data to set the interval of the voice signal.

The effect track is written with effect control data for controlling the effect FPGAs 33 and 34. The effect control data specifies one of the circuit reconfiguration information items stored in the circuit reconfiguration information part of the song data. When this effect control data is read from the effect track, the specified circuit reconfiguration information is outputted to the effect FPGA 33 or 34. The circuit configuration information of the effect FPGAs 33 and 34 may be downloaded from the distribution center 4 as part of the song data. Alternatively, the circuit reconfiguration information of plural types may be downloaded in advance separately from the song data. In such a case, the effect control data recorded on the effect track may specify one of the downloaded circuit configuration information items.

Figure 5:
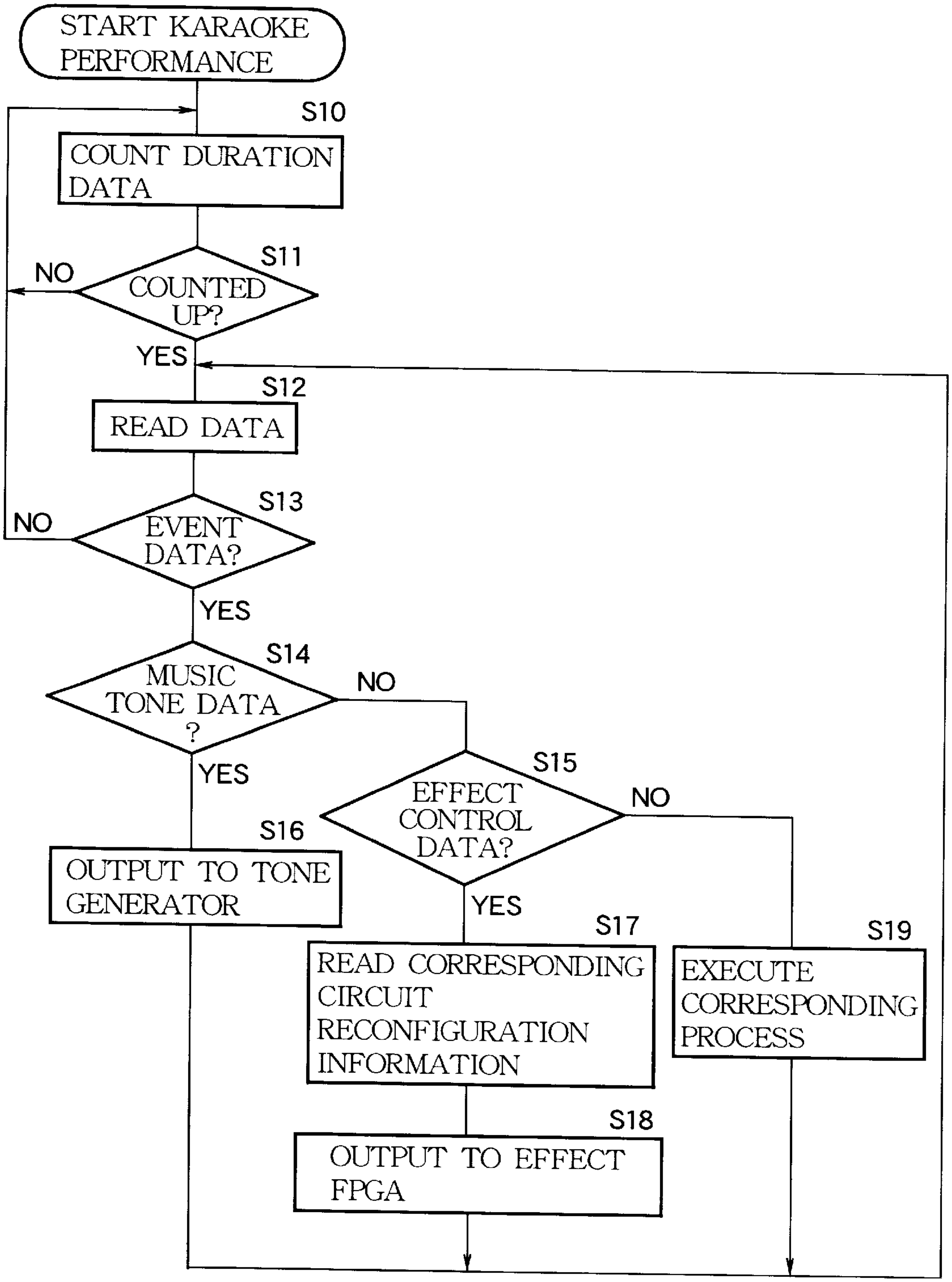
FIG. 5 is a flowchart indicative of an operation of the karaoke apparatus shown in FIG. 3.

The operation indicated by the flowchart shown in FIG. 5 is executed during the performance of karaoke music based on the above-mentioned song data. The duration data read from the song data is counted in step S10. When the duration data has been counted up in step S11, the next data is read in step S12. If this next data is event data, operations of steps S14 and so on are executed. If this next data is duration data, the same is counted in step S10.

If the data is event data, the data types are determined in steps S14 and S15. It should be noted that this operation is applied to the case in which all items of event data of the song data are recorded on one track. This operation is generally applicable to the case in which separate tracks are arranged for data types such as tone track and effect track as shown in FIG. 4 and duration data is separately counted for data reading. However, in such a case, the counting of the duration data is executed for each track, separately.

If the event data is determined to be tone data in step S14, the tone data is fed to the tone generator 32 to synthesize a music tone signal in step S16. If the event data is determined effect control data in step S15, the circuit reconfiguration information specified by the effect control data is read in step S17 and supplied to the effect FPGA 33 or FPGA 34. One of the FPGAs to which the reconfiguration information is to be supplied is specified in the effect control data.

If data other than the tone data and effect control data has been read, the processing corresponding to that data is executed in step S19, upon which next data is read in step S12. The operations of steps S14 and so on are repeated until duration data is read. When duration data is read, the processing returns to step S10. When performance end data is read, the music tone being sounded is turned off, upon which the karaoke performance processing comes to an end.

A machine readable medium such as CD-ROM may be used in the karaoke apparatus 3 comprising of a sound source, an effector, and a CPU for providing an orchestral accompaniment to a live vocal of a requested song. The medium contains data of the requested song processed by the CPU to cause the karaoke apparatus 3 to perform the operations as described above in conjunction with FIG. 5. The operation is executed in steps of operating the sound source according to the data of the request song for generating a music tone of the orchestral accompaniment to accompany the live vocal, operating the effector according to the data of the request song for applying an acoustic effect to either of the music tone and the live vocal during the course of the orchestral accompaniment, the effector having a reconfigurable circuit structure to alter the acoustic effect, reading reconfiguration information of the effector from the data of the request song when the acoustic effect is to be altered, and reconfiguring the circuit structure of the effector according to the read reconfiguration information.

In the foregoing, the description has been made by use of a karaoke apparatus for example. It will be apparent to those skilled in the art that the present invention is also applicable to any electronic apparatuses using devices of which circuit configuration can be modified in the same fashion as a PLD and an FPGA can.

As described and according to the invention, a hardware configuration of an electronic apparatus can be modified through a communication network. Therefore, if a change occurs in the specifications of the electronic apparatus, after its shipment, the change can be attended without direct intervention of manufacturer's personnel. Thus, hardware-dependent problems found after the shipment or production can be attended simply by downloading the circuit reconfiguration information for the electronic apparatus. Further, application of the present invention to an I/O extension port of an electronic apparatus, of which specifications are not fully defined at production, allows the user to easily provide the specifications adapted to an extension device to be connected by simply downloading the circuit reconfiguration information for the specifications defined after the production. In addition, application of the present invention to the effect imparting circuit of a karaoke apparatus allows the user to impart different acoustic effects to different pieces of music and to impart effects that vary with the progression of karaoke music.

While the preferred embodiments of the present invention have been described using specific terms, such description is for illustrative purposes only, and it is to be understood that changes and variations may be made without departing from the spirit or scope of the appended claims.

What is claimed is:

1. An electronic apparatus constructed by various devices for collectively executing a task, comprising:

at least one programmable logic device (PLD) containing a plurality of circuit elements which are reconfigurable into a desired connection mode so as to perform an allotted function during the course of executing the task;

a communication device operative when the allotted function of the PLD is to be altered, the communication device downloading, from a communication network, circuit design information effective to determine the connection mode of the circuit elements contained in the PLD; and a control device that reconfigures the connection mode of the circuit elements in accordance with the downloaded circuit design information to thereby alter the allotted function of the PLD.

2. The electronic apparatus according to claim 1, wherein the PLD is dedicated to perform an allotted function of applying an acoustic effect to a sound during the course of executing a task of generating the sound, and wherein the control device reconfigures the connection mode of the circuit elements of the PLD to alter the acoustic effect.

3. An electronic apparatus constructed by various devices for collectively executing a task, comprising:

at least one electronic circuit device containing a plurality of circuit elements which are reconfigurable into a desired connection mode so as to perform an allotted function during the course of executing the task;

a communication device operative when the allotted function of the electronic circuit device is to be altered, the communication device downloading, from a communication network, circuit design information effective to determine the connection mode of the circuit elements contained in the electronic circuit device; and a control device that reconfigures the connection mode of the circuit elements in accordance with the downloaded circuit design information to thereby alter the allotted function of the electronic circuit device, wherein the electronic circuit device is dedicated to perform an allotted function of interfacing a peripheral device selected [as necessary] for executing the task, and wherein the control device reconfigures the connection mode of the circuit elements of the electronic circuit device so as to adapt the allotted function of interfacing to the selected peripheral device.

4. An electronic apparatus constructed by various devices for collectively executing a task, comprising:

at least one electronic circuit device containing a plurality of circuit elements which are reconfigurable into a desired connection mode so as to perform an allotted function during the course of executing the task;

a communication device operative when the allotted function of the electronic circuit device is to be altered, the communication device downloading, from a communication network, circuit design information effective to determine the connection mode of the circuit elements contained in the electronic circuit device; and a control device that reconfigures the connection mode of the circuit elements in accordance with the downloaded circuit design information to thereby alter the allotted function of the electronic circuit device, wherein the electronic circuit device comprises a programmable gate array having circuit elements instantly reconfigurable in accordance with the circuit design information to thereby realize dynamic alteration of the allotted function during the course of the executing the task.

5. A method of altering an electronic apparatus being constructed by various devices which collectively executes a task, the method comprising the steps of:

providing at least one programmable logic device (PLD) containing a plurality of circuit elements which are reconfigurable into a desired connection mode so as to perform an allotted function during the course of executing the task;

downloading circuit design information, from a communication network when the allotted function of the PLD is to be altered, the circuit design information being effective to determine the connection mode of the circuit elements contained in the PLD; and reconfiguring the connection mode of the circuit elements in accordance with the downloaded circuit design information to thereby alter the allotted function of the PLD.

6. A karaoke apparatus constructed by various devices for providing an orchestral accompaniment to a live vocal of a requested song, the karaoke apparatus comprising:

a sound source device operative according to data of the requested song for generating a music tone of the orchestral accompaniment to accompany the live vocal;

at least one effector device for applying an acoustic effect to either of the music tone and the live vocal during the course of the orchestral accompaniment, the effector device having a reconfigurable circuit structure that utilizes programmable logic to alter the acoustic effect;

a memory device that stores reconfiguration information of the effector device; and a control device, operating when the acoustic effect is to be altered, to retrieve the reconfiguration information from the memory device and reconfigure the circuit structure of the effector device according to the retrieved reconfiguration information.

7. The karaoke apparatus according to claim 6, wherein the memory device stores the reconfiguration information as a part of the data of the requested song, and wherein the control device retrieves the reconfiguration information from the memory device to alter the acoustic effect in matching with the orchestral accompaniment of the requested song.

8. A karaoke apparatus constructed by various devices for providing an orchestral accompaniment to a live vocal of a requested song, the karaoke apparatus comprising:

a sound source device operative according to data of the requested song for generating a music tone of the orchestral accompaniment to accompany the live vocal;

at least one effector device for applying an acoustic effect to either of the music tone and the live vocal during the course of the orchestral accompaniment, the effector device having a reconfigurable circuit structure to alter the acoustic effect;

a memory device that stores reconfiguration information of the effector device; and a control device, operating when the acoustic effect is to be altered, to retrieve the reconfiguration information from the memory device and reconfigure the circuit structure of the effector device according to the retrieved reconfiguration information, wherein the effector device comprises a programmable gate array instantly reconfigurable in response to retrieval of the reconfiguration information to thereby realize dynamic alteration of the acoustic effect during the course of the orchestral accompaniment.

9. A karaoke apparatus constructed by various devices for providing an orchestral accompaniment to a live vocal of a requested song the karaoke apparatus comprising:

a sound source device operative according to data of the requested song for generating a music tone of the orchestral accompaniment to accompany the live vocal;

at least one effector device for applying an acoustic effect to either of the music tone and the live vocal during the course of the orchestral accompaniment, the effector device having a reconfigurable circuit structure to alter the acoustic effect;

a memory device that stores reconfiguration information of the effector device;

a control device, operating when the acoustic effect is to be altered, to retrieve the reconfiguration information from the memory device and reconfigure the circuit structure of the effector device according to the retrieved reconfiguration information;

peripheral devices selectable to support execution of the orchestral accompaniment; and an interface device having a reconfigurable circuit structure for interfacing a selected one of the peripheral devices, wherein the control device, operating when the selected peripheral device is changed to another peripheral device, retrieves reconfiguration information from the memory device and reconfigures the circuit structure of the interface device in accordance with the retrieved reconfiguration information so as to adapt the interface device to said another peripheral device.

10. The karaoke apparatus according to claim 6, further comprising a communication device operative when acoustic effect is to be altered, the communication device downloading the reconfiguration information of the effector device into the memory device from a communication network.

11. A machine readable medium, used in a karaoke apparatus including a sound source, an effector, and a CPU, for providing an orchestral accompaniment to a live vocal of a requested song, the medium containing data of the requested song processed by the CPU to cause the karaoke apparatus to perform the steps of:

operating the sound source according to the data of the requested song for generating a music tone of the orchestral accompaniment to accompany the live vocal;

operating the effector according to the data of the requested song for applying an acoustic effect to either of the music tone and the live vocal during the course of the orchestral accompaniment, the effector having a reconfigurable circuit structure that utilizes programmable logic to alter the acoustic effect;

reading configuration information of the effector from the data of the requested song when the acoustic effect is to be altered; and reconfiguring the circuit structure of the effector according to the read reconfiguration information.

12. An electronic apparatus constructed by various devices for collectively executing a task, comprising:

at least one circuit device having programmable connections among internal circuit elements, the circuit device containing a plurality of circuit elements which are reconfigurable into a desired connection mode so as to perform an allotted function during the course of executing the task;

a communication device operative when the allotted function of the circuit device is to be altered, the communication device downloading, from a communication network, circuit design information effective to determine the connection mode of the circuit elements contained in the circuit device; and a control device that reconfigures the connection mode of the circuit elements in accordance with the downloaded circuit design information to thereby alter the allotted function of the circuit device.

13. The electronic apparatus according to claim 12, wherein the circuit device is dedicated to perform an allotted function of applying an acoustic effect to a sound during the course of executing a task of generating the sound, and wherein the control device reconfigures the connection mode of the circuit elements of the circuit device to alter the acoustic effect.

14. The electronic apparatus according to claim 12, wherein the circuit device is dedicated to perform an allotted function of interfacing a peripheral device selected as necessary for executing the task, and wherein the control device reconfigures the connection mode of the circuit elements of the circuit device so as to adapt the allotted function of interfacing to the selected peripheral device.

15. The electronic apparatus according to claim 12, wherein the electronic circuit device comprises a programmable gate array having circuit elements instantly reconfigurable in accordance with the circuit design information to thereby realize dynamic alteration of the allotted function during the course of the executing the task.

16. A method of altering an electronic apparatus being constructed by various devices which collectively executes a task, the method comprising the steps of:

providing at least one circuit device having programmable connections among internal circuit elements, the circuit device containing a plurality of circuit elements which are reconfigurable into a desired connection mode so as to perform an allotted function during the course of executing the task;

downloading circuit design information, from a communication network, when the allotted function of the circuit device is to be altered, the circuit design information being effective to determine the connection mode of the circuit elements contained in the circuit device; and reconfiguring the connection mode of the circuit elements in accordance with the downloaded circuit design information to thereby alter the allotted function of the circuit device.

17. An electronic apparatus constructed by various devices for collectively executing a task, comprising:

at least one circuit device having programmable connections among internal circuit elements, the circuit device containing a plurality of circuit elements which are reconfigurable into a desired connection mode so as to perform an allotted function during the course of executing the task;

a memory device that stores circuit design information effective to determine the connection mode of the circuit elements contained in the circuit device; and a control device operative when the allotted function of the circuit device is to be altered, the control device retrieving the circuit design information from the memory device and reconfiguring the connection mode of the circuit elements in accordance with the retrieved circuit design information to thereby alter the allotted function of the circuit device.

18. The electronic apparatus according to claim 17, wherein the circuit device is dedicated to perform an allotted function of applying an acoustic effect to a sound during the course of executing a task of generating the sound, and wherein the control device reconfigures the connection mode of the circuit elements of the circuit device to alter the acoustic effect.

19. The electronic apparatus according to claim 17, wherein the circuit device is dedicated to perform an allotted function of interfacing a peripheral device selected as necessary for executing the task, and wherein the control device reconfigures the connection mode of the circuit elements of the circuit device so as to adapt the allotted function of interfacing to the selected peripheral device.

20. The electronic apparatus according to claim 17, wherein the electronic circuit device comprises a programmable gate array having circuit elements instantly reconfigurable in accordance with the circuit design information to thereby realize dynamic alteration of the allotted function during the course of the executing the task.

* * * * *